United States Patent
Ziemer et al.

(10) Patent No.: US 6,728,084 B2
(45) Date of Patent: Apr. 27, 2004

(54) SYSTEM AND METHOD FOR OVERVOLTAGE PROTECTION OF AN INTEGRATED CIRCUIT

(76) Inventors: Kevin W. Ziemer, 8308 Weiss Ave., Plano, TX (US) 75025; Fredrick W. Trafton, 1120 Breezewood Dr., Lewisville, TX (US) 75077; Alaa-Eldin Y. El-Sherif, 2516 Brycewood La., Plano, TX (US) 75025; Mehedi Hassan, 3801 Rolling Hills Dr., Plano, TX (US) 75025

( * ) Notice: Subject to any disclaimer, the term of this patent is extended or adjusted under 35 U.S.C. 154(b) by 65 days.

(21) Appl. No.: 10/094,200

(22) Filed: Mar. 8, 2002

(65) Prior Publication Data

US 2003/0169549 A1 Sep. 11, 2003

(51) Int. Cl.[7] .................................................. H02H 7/09
(52) U.S. Cl. ...................... 361/33; 361/91.6; 363/56.05
(58) Field of Search ........................ 361/33, 86, 91.1, 361/91.6; 363/56.05

(56) References Cited

U.S. PATENT DOCUMENTS

| | | | | |
|---|---|---|---|---|
| 4,400,755 A | * | 8/1983 | Lezan | 361/91 |
| 5,751,531 A | | 5/1998 | Rault | 361/56 |
| 5,930,096 A | | 7/1999 | Kim | 361/91 |
| 6,028,755 A | * | 2/2000 | Saeki et al. | 361/91.6 |

* cited by examiner

*Primary Examiner*—Jeffrey Sterrett
(74) *Attorney, Agent, or Firm*—W. Daniel Swayze, Jr.; W. James Brady; Frederick J. Telecky, Jr.

(57) ABSTRACT

A protection system for an integrated circuit is disclosed. A detection system detects an overvoltage condition and provides an overvoltage condition signal to indicate a condition in which overvoltage protection may be desired. In response to the overvoltage condition signal, one or more variable resistance devices in the system, such as power devices of associated driver circuitry, are controlled to limit the voltage across such devices.

27 Claims, 5 Drawing Sheets

SYSTEM AND METHOD FOR OVERVOLTAGE PROTECTION OF AN INTEGRATED CIRCUIT

TECHNICAL FIELD

The present invention relates generally to overvoltage protection and, more particularly, to a system and method to protect an integrated circuit from overvoltage conditions.

BACKGROUND OF THE INVENTION

Numerous types of electronic devices for a myriad of applications employ electrical circuits implemented as one or more integrated circuits (ICs). For example, ICs are configured to achieve desired functions, for example, control of associated devices, digital-to-analog (D/A) or analog-to-digital (A/D) conversion, mixed signal analysis, etc.

Typically, an integrated circuit is designed to tolerate a specified maximum operating power supply voltage. The maximum voltage is usually higher than the nominal operating voltage by about 10% or less. Under some transient conditions, however, the voltages that can appear on the supply pins of the IC are much greater than this maximum operating voltage, known as an overvoltage condition. An overvoltage condition can cause damage to the IC, such as if voltage applied to one or more associated components exceeds the breakdown voltage of such components. For example, IC components of a power driver, such as are used to modulate large currents necessary to drive mechanical devices (e.g., motors), are susceptible to damage due to overvoltage conditions.

One solution is to employ a shunt regulator to limit the voltage during an overvoltage condition. However, a shunt regulator usually requires a large device to handle high current and provide desired high power dissipation. Such a device tends to require a large amount of die area on the IC. It also has been determined that transients can damage the shunt regulator itself, which damage can, in turn, cause damage to the IC.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to overvoltage protection. One aspect of the present invention provides a protection system for an integrated circuit, such as can be configured to control operation of one or more motors. The integrated circuit includes an input terminal that receives an input supply voltage. A detection system detects an overvoltage condition at the input terminal or at other parts of the integrated circuit and provides an overvoltage condition signal to indicate a condition in which overvoltage protection may be desired. In response to the overvoltage condition signal, one or more variable resistance devices in the system, such as power devices of associated driver circuitry, are controlled to limit the voltage across such devices. For example, where the variable resistance devices are power transistors, such transistors can be turned on by associated controls to limit the voltage across the transistors. This can effectively increase the input voltage at which breakdown of the transistors usually occurs.

In accordance with a particular aspect, the overvoltage protection system can include a driver having at least one pair of high-side and low-side power devices electrically coupled in series between the input terminal and ground potential. A node interconnecting the pair of power devices can be coupled to a terminal that is operative to provide power to an associated phase of a motor, such as spindle motor, a voice coil motor, or other motor system. To help protect each of the power devices in circumstances of an overvoltage condition, an overvoltage control system can be connected to each of the high-side and low-side power devices to control each of the respective devices in a mode more tolerant to an overvoltage condition. Such control can be based on the overvoltage condition signal as well as a voltage potential across the respective high-side and low-side power devices.

Another aspect of the present invention provides a method to protect an integrated circuit. The method, which can be implemented relative to a driver of the integrated circuit, includes detecting a condition in which overvoltage protection is desired. In response to detecting the condition, at least one of the first and second active devices (e.g., power transistors of the driver) are operated in a mode that limits a voltage potential across the respective power devices so as to be more tolerant to the detected overvoltage condition.

The following description and the annexed drawings set forth certain illustrative aspects of the invention. These aspects are indicative, however, of a few ways in which the principles of the invention may be employed. Other advantages and novel features of the invention will become apparent from the following detailed description of the invention when considered in conjunction with the drawings.

DETAILED DESCRIPTION OF THE INVENTION

Figure 1:
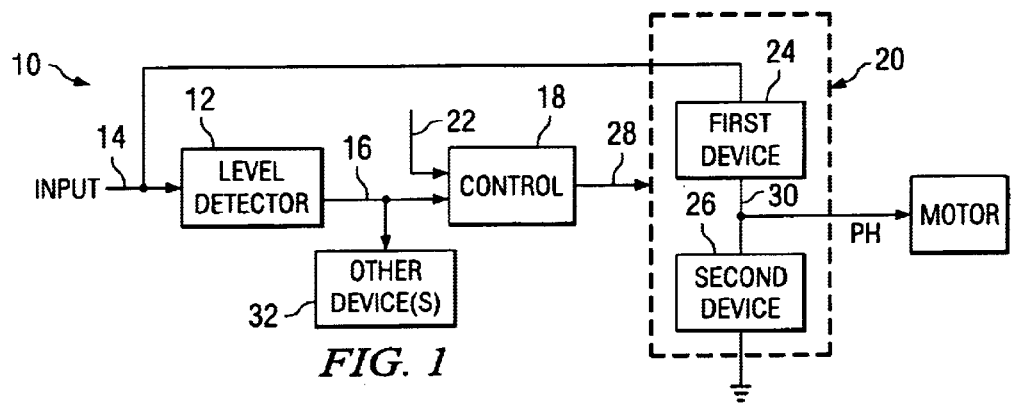
FIG. 1 is a simplified block diagram illustrating a protection system in accordance with an aspect of the present invention.

FIG. 1 is a block diagram of a protection system 10 in accordance with an aspect of the present invention. The system 10 includes a level detector 12 that receives an input signal at an input 14. For example, the input 14 can correspond to or be electrically coupled to an input terminal of an integrated circuit that includes the system 10. The input signal can be provided to the input 14 directly from a power supply or derived internally from another input (not shown) of the system 10. The level detector 12 is operative to detect whether the input signal at 14 is some reference level, such as set to a level about less than or equal to a maximum breakdown voltage for one or more components in the system 10 or its associated integrated circuit. Those skilled in the art will understand and appreciate the reference level can be selected according to a particular technology being implemented.

The level detector 12 provides a mode signal 16 to a control system 18 indicative of the detected signal level. The signal 16 can indicate, for example, whether the level of the input signal is above or below the predetermined reference level. While described as providing an indication of two discrete operating conditions (or states), it is to be appreciated that the level detector 12 could provide the signal 16 to indicate more than two different states in accordance with an aspect of the present invention.

The control 18 is programmed and/or configured to control operation of an associated output stage 20 based on the signal 16. In addition, or as an alternative, the mode control 18 can receive one or more other input signals 22 based on which control of the output stage 20 can be implemented. For example, the other input signal can correspond to another condition of the system 10 for which it may be desirable to protect the system 10 and associated circuitry 20 from a potential overvoltage condition. That is, the control 18 can determine an operating mode of the system 10 based on the signals 16 and 22, which mode includes a protection mode in accordance with an aspect of the present invention.

The output stage 20 includes a plurality of devices 24 and 26, which can be arranged in one or more pairs of devices. The control 18 provides a control signal 28 to the output stage 20 that controls operation of each of the devices 24 and 26 according to the operating mode of the system 10. When operating in the protection mode, the devices 24 and 26 are controlled in a manner to protect the system, such as by activating one or both of the devices so as to limit the voltage across the respective device(s).

By way of illustration, the devices 24 and 26 are active devices electrically connected between the input 14 and a known reference potential, such as electrical ground. In example illustrated in FIG. 1, the first device 24 is coupled between the input 14 and an intermediate node 30 and the second device 26 is coupled between the node and ground. In accordance with an aspect of the present invention, the control 18 determines the operating mode based on one or both of the signals 16 and 22 and provides the control signal 28 accordingly. The control signal 28 controls the first and second devices so as to either sink or source current relative to the node 30. In the protection mode, such as in response to detecting an overvoltage condition at 14 (or other system condition), the first and second devices 24 and 26 are controlled to limit the voltage across such devices. To facilitate protecting the system 10, the protection mode can override all other operating modes of the system.

It is to be understood and appreciated that the detector signal 16 also can be used to control one or more other output devices 32 in accordance with an aspect of the present invention. The other devices, for example, can be output stages including driver circuitry, push-pull up systems or other systems that may derive power from the input 14.

Figure 2:
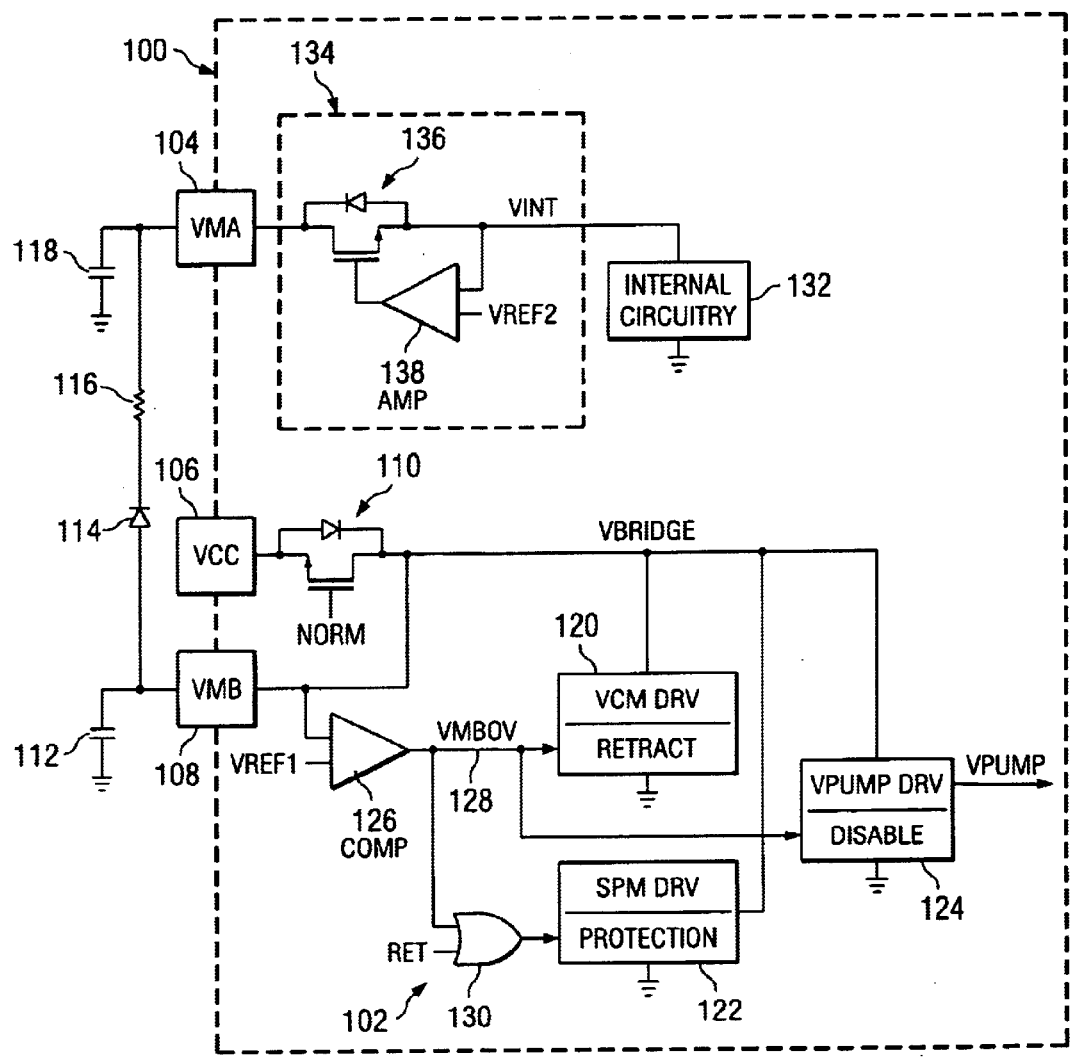
FIG. 2 is a block diagram of part of an integrated circuit implementing a protection system in accordance with an aspect of the present invention.

FIG. 2 depicts an example of part of an integrated circuit 100 implementing a protection system 102 in accordance with an aspect of the present invention. In this example, the integrated circuit 100 corresponds to a control system for a mass storage device, such as a hard disk drive. It is to be understood and appreciated that the present invention is equally applicable to protecting other types and configurations of integrated circuits.

The circuit includes a plurality of input terminals 104, 106, and 108. Each terminal 104, 106, 108 can be coupled to a power supply (directly or indirectly) to provide a desired input voltage at the respective terminals. For example, the terminal 106 is a voltage control channel (VCC) that receives a desired voltage level, such as 12 or 5 volts DC. The terminal 108 is coupled to the terminal 106 via an isolation switch 110, which can include a transistor having a parasitic diode in parallel. A capacitor 112 also can be coupled between the terminal 108 and electrical ground, such as to mitigate noise and help stabilize the voltage at the terminal 112. The terminal 104 is coupled to the terminal 108 via a series diode 114 and a resistor 116, with a capacitor 118 coupled between the terminal 104 and ground to mitigate noise.

The terminal 108 is coupled to provide a bridge voltage (VBRIDGE) to associated components 120, 122 and 124 of the circuit 100. In this example, the components 120, 122, and 124 are implemented as drivers, although the bridge voltage can be provided to other types of components. For example, the driver 120 is a driver for a voice coil motor, the driver 122 is a driver for a spindle motor and the driver 124 is a driver for voltage pump. Each of the drivers 120, 122 and 124 can operate in a plurality of modes, including a protection mode in accordance with an aspect of the present invention.

The protection system 102 includes a comparator 126 coupled to the terminal 108 to receive a signal corresponding to the bridge voltage. The comparator 126 also receives a reference voltage indicative of a threshold voltage level, indicated at VREF1. The threshold level VREF1 is set to a level to discern whether the bridge voltage at 108 is less than or equal to about the maximum allowed voltage for the components associated with drivers 120, 122 and 124. For example, if the voltage at the terminal 108 (and bridge voltage) is desired to be about 12 volts, the reference voltage can be set to about 14.5 volts or less.

The comparator 126 includes an output 128 that provides a comparator output signal for controlling a protection mode of each of the associated drivers 120, 122 and 124. Thus, if the bridge voltage at 108 exceeds the level defined by VREF1, the comparator 126 provides an output signal at 128 indicative of an overvoltage condition. When the signal provided at 128 indicates the occurrence of an overvoltage condition, each of the drivers 120, 122 and 124 operates in a protection mode. In contrast, if the voltage at 108 is less than or equal to VREF1, the comparator output signal indicates that an overvoltage condition does not exist at the terminal 108. When an overvoltage condition does not exist, the system is free to operate in any of its other possible operating modes.

By way of example, a transient on an external supply line connected to the terminal 106 can force the terminal 108 high to an overvoltage condition through the switch 110 or its parasitic diode. The voltage at the terminal 108 can also be forced high due to flyback voltage generated by a motor (e.g., a Voice Coil Motor or Spindle Motor) associated with the one or both of the drivers 120 and 122. Such flyback voltage, for example, can be pumped to the terminal 108 through parasitic diodes of the High-side Power FETs of the respective drivers 120 and 122.

With regard to the driver 122, the comparator output 128 is provided as an input to an OR gate 130. The other input of the OR gate 130 receives a signal (RET) indicative of a retract condition. By ORing the respective signals, the driver 122 thus operates in its protection mode if an overvoltage condition exists at the terminal 108 or if a retract condition has been initiated. It is to be appreciated that the protection mode associated with an overvoltage condition at the terminal 108 can be employed to override all other operating modes of the system.

The voltage pump driver 124 drives VPUMP to a voltage above VMB. This voltage can be used to drive N-type FETs that are the high-side power devices, such as associated with the drivers 120 and 122. If the supply voltage at 108 is at a voltage high enough to be potentially destructive, VPUMP can also be high enough to be destructive. To mitigate this, the overvoltage signal at 128 disables the pumping action provided by the driver 124 during an overvoltage condition. The IC can actively drain the voltage that remains on a VPUMP capacitor without damage to the IC due to the limited current sourcing capability of the associated capacitor. The driver 124 has parasitic components to the bridge voltage at 108 that limit its lowest value to be from, for example, about 1V to about 2V below the supply voltage at 108. During the overvoltage condition, the VPUMP value is high enough to drive the high-side devices of the voice coil motor. The high-side devices of the spindle motor, however, do not use the VPUMP voltage in overvoltage mode.

The terminal 104 is coupled to internal circuitry 132 through a voltage regulator 134, which operates to isolate the terminal from the internal circuitry. The voltage regulator 134 provides an internal voltage to the internal circuitry 132 based on the voltage at the terminal 104. For example, the regulator 134 can include an isolation transistor (e.g., a FET having a parasitic diode) 136 coupled between the internal circuitry 132 and the terminal 104. The isolation transistor 136 is controlled by an amplifier 138, such as supplies a gate voltage based on the internal voltage $V_{INT}$ and a reference voltage VREF2. For example, the regulator 134 regulates the internal voltage $V_{INT}$ to be less than the reference voltage VREF2, which is set to a level less than or equal to the breakdown voltage of the components in the internal circuitry 132. It is to be appreciated that the regulator 134 can be controlled to provide the internal voltage $V_{INT}$ according to the operating mode of the system, which further can be based on the comparator output signal provided at 128.

During a power-up of the IC 100, the power supplied at 106 can ramp from a low value to an overvoltage condition quite rapidly. Inductive effects in the supply lines can cause the voltage at the IC 100 to rise at a rate of several volts per microsecond. Under these conditions, conventional internal power protection circuits might not respond quickly enough. The present invention thus provides an additional circuit that bridges the time gap between power-up of the input terminals 106 and 108 and the time at which the power protection functions are fully active. This circuit, for example, pulls the low-side and high-side devices of the spindle motor and voice coil motor to an off condition. This helps prevent shoot-through damage.

Figure 3:
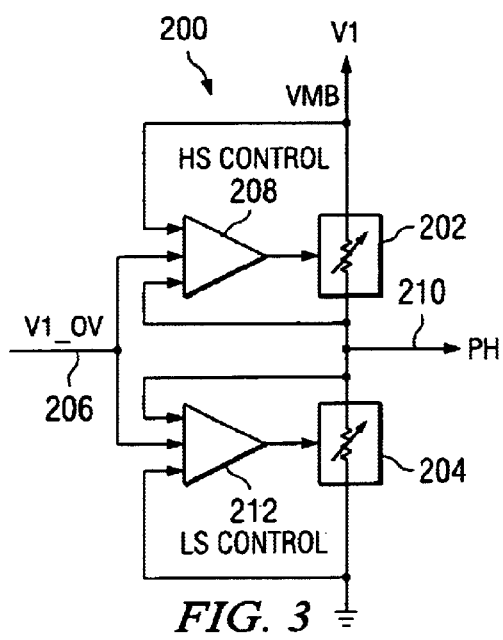
FIG. 3 is an example of part of a protection system for limiting voltage across output devices in accordance with an aspect of the present invention.

FIG. 3 is an example of a protection system 200 that is operative to limit voltage across one or more devices 202 and 204 during an overvoltage condition in accordance with an aspect of the present invention. The system 200 operates to control operation of the devices 202 and 204 in response to an input signal V1_OV at 206 indicating that an input voltage V1 is in an overvoltage condition. The input voltage V1, for example, can be supplied at a terminal of an associated integrated circuit that includes the system 200. The devices 202 and 204 are coupled between the input voltage V1 and a lower potential, such as electrical ground. Thus, in the absence of the present invention, the device 202 could be damaged if the voltage at V1 with respect to node 210 is at a level that exceeds the breakdown voltage of device 202. Similarly, the device 204 could be damaged if the voltage at node 210 with respect to ground is at a level that exceeds the breakdown voltage of device 204. The devices 202 and 204 are schematically represented as variable controlled resistance components. For example, such components can be transistors, thyristors or other types of active devices capable of providing a variable resistance.

The system 200 also includes a high-side (HS) control 208 coupled between the input voltage V1 and an intermediate node 210. The node 210, for example, is coupled to a phase winding of a motor, indicated at PH. The HS control is operative to control the device 202 based on the V1_OV signal and the voltage at V1 with respect to the voltage at the node 210. A low-side (LS) control 212 is coupled between the node 210 and ground. The LS control 212 is operative to control the device 204 based on the V1_OV signal and the voltage at the node 210 with respect to the ground potential.

For example, assuming an overvoltage condition, if the voltage at the node 210 is more than some predetermined level below the voltage at V1, the HS control 208 can operate the device 202 as a low resistance path so as to conduct electrical current. During such a condition, the LS control 212 can, in contrast, operate the device 204 as a high resistance path (e.g., an open). Similarly, during an overvoltage condition, if the voltage at the node 210 exceeds ground potential by more than the reference voltage, the LS control 212 can operate the device 204 as a low resistance path so as to conduct electrical current through the device, while the device 202 is operated as a relatively high resistance path. Generally, the devices 202 and 204 are operated mutually exclusively so as to mitigate shoot through current. In certain circumstances, however, including extremely high voltage conditions (e.g., more than about twice the breakdown voltage of the devices 202 and/or 204), the LS control and the HS control both can operate the devices 202 and 204 concurrently as low resistance paths. Alternatively, both devices 202 and 204 can be operated concurrently as very high resistance paths (e.g., open circuits), so as to provide protection corresponding to the sum of the low-side and high-side breakdown voltages.

Figure 4:
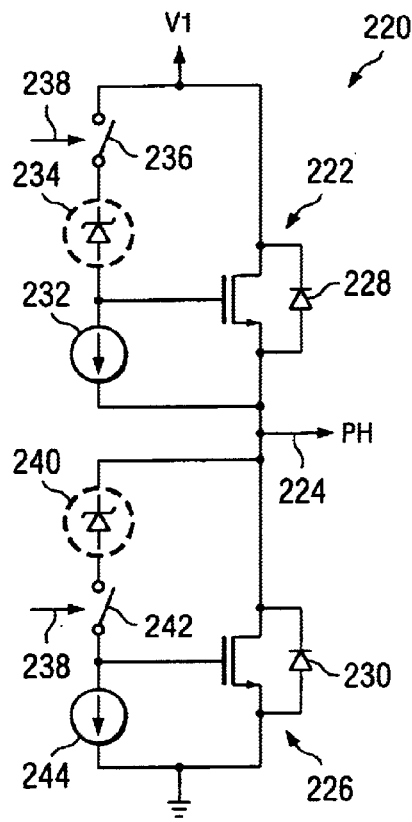
FIG. 4 is another example of part of a protection system for limiting voltage across output devices in accordance with an aspect of the present invention.

FIG. 4 is another example of a conceptual diagram for part of a protection system in accordance with an aspect of the present invention. The system 220 includes a high-side component 222 connected between an input voltage V1 and an intermediate node 224. The input voltage can be coupled to an input terminal of an IC and the input node can be connected to a phase winding of an associated motor. The system 220 also includes a low-side component 226 connected between the node 224 and electrical ground. For example, each of the high-side and low-side components 222 and 226 includes a respective transistor (e.g., a FET) 228 and 230 that is operated in a protection mode during an overvoltage condition so that the voltage across each of the transistor devices 228 and 230 is limited.

Turning to the high-side component 222, the transistor 228 includes a source and drain coupled between V1 and the node 224. A control gate of the transistor 228 is coupled to a node between a current source 232 and a composite Zener 234. The switch device 236 is coupled between the composite Zener 234 and the input voltage V1. The switch 236 is controlled based on a control signal 238 indicative of a detected overvoltage condition associated with the input voltage V1. The current source 232 attempts to turn the transistor 228 off by driving current from the gate to the node 224. If the voltage potential between V1 and the node 224 is greater than a predetermined reference voltage, which, for example, is about equal to or less than a breakdown voltage for the device 228, the switch 236 can be closed. When the switch 236 is closed, if the voltage potential across the transistor 228 (V1 relative to the voltage at 224) exceeds a breakdown voltage of the composite Zener 234 plus the threshold of the high-side transistor 228, the high-side transistor 228 will turn on, such that the voltage across the transistor (e.g., the drain to source voltage) will be limited.

In a similar manner, the low-side component 226 includes a composite Zener 240, a switch device 242 and current source 244 connected in series between the node 224 and electrical ground. A node between the switch 242 and current source 244 is coupled to control the transistor 230 (e.g., to a gate of a MOSFET transistor). Thus, provided that the switch 242 is activated to a closed condition, such as in response to the control signal 238 indicative of an overvoltage condition, and if the voltage at the node 224 relative to ground exceeds the breakdown voltage of the composite Zener 240 plus the threshold of the low-side transistor 230, the low-side transistor 230 will turn on, such that the voltage across the transistor 230 (e.g., a drain to source voltage of a MOSFET) will be limited.

In accordance with an aspect of the present invention, the switches 236 and 242 can be controlled in a mutually exclusive manner. For example, the switch 236 can be on unless the transistor 230 is on and the switch 242 can be on unless the transistor 228 is on. This cross coupling helps prevent both power devices 228 and 230 from being on simultaneously so as mitigate shoot through. However, it is to be understood and appreciated that in situations when the overvoltage is sufficiently high (e.g., about twice the breakdown voltages of the transistors 228 and 230), both switches 236 and 242 can be activated to closed conditions to turn on the transistors 228 and 230 concurrently in an effort to mitigate high voltage conditions across such devices. Alternatively, both the transistors 228 and 230 could be turned off concurrently during such an overvoltage condition to provide desired protection. It is to be appreciated that the power devices do not attempt to drive the associated phase winding (PH) via the node 224 during an overvoltage condition.

Figure 5:
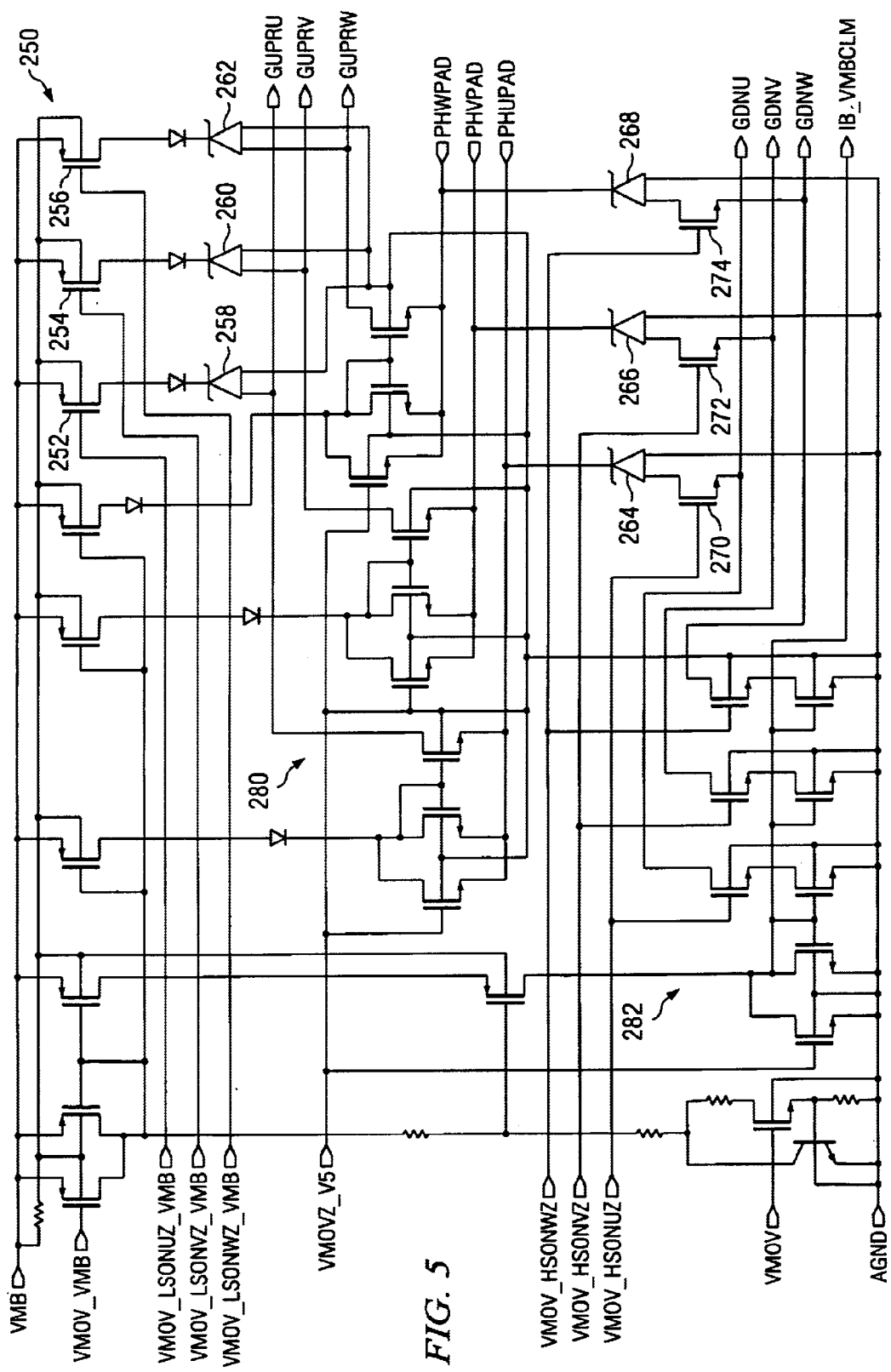
FIG. 5 is an example of a circuit diagram of part of a protection system in accordance with an aspect of the present invention.

FIG. 5 is an example of a circuit schematic for part of a protection system. In particular, the portion illustrated in FIG. 5 corresponds to circuitry operative to control high-side and low-side power devices for a three phase motor during an overvoltage condition according to an aspect of the present invention. In the example depicted in FIG. 5, the input voltage, such as supplied at an input terminal of an associated integrated circuit, is indicated at VMB. The circuit 250 also includes a plurality of MOSFET devices 252, 254 and 256 acting as switches connected between the input voltage VMB and respective composite Zeners 258, 260 and 262. Each of the composite Zeners 258, 260, 262 further is coupled to control a gate of an associated power device indicated at GUPRU, GUPRV and GUPRW. The composite Zeners 258, 260 and 262 also are coupled to a respective end of a phase winding of the associated three phase motor, indicated at PHUPAD, PHVPAD and PHWPAD, respectively.

Each of the MOSFETs 252, 254 and 256 is controlled by a respective control signal indicated at VMOV_LSONUZ_VMB, VMOV_LSONVZ_VMB and VMOV_LSONWZ_VMB. These respective signals are generated by control logic in accordance with an aspect of the present invention. Those skilled in the art will understand and appreciate various implementations of such control logic based on the description herein.

The illustrated circuit diagram in FIG. 5 also includes a low-side control for each phase of the associated motor. In particular, each low-side control includes a composite Zener 264, 266 and 268 connected in series with an associated MOSFET 270, 272 and 274. In particular, each series combination of Zener and MOSFET is connected between associated phase terminals PHUPAD, PHVPAD and PHWPAD for connecting to a respective phase of a motor and a respective gate of a power device, indicated at GDNU, GDNV and GDNW. Each of the MOSFET switches 270, 272 and 274 of the low-side controls is itself controlled by a signal generated by associated control logic, which signals are indicated at VMOV_HSONWZ, VMOV_HSONVZ and VMOV_HSONUZ. The high-side current sources are provided by an arrangement of transistors, indicated at 280, and the low-side current sources are provided by another arrangement of transistors, indicated at 282. These transistors 280 and 282 implement functions that correspond to the functions of current source 232 and current source 244, respectively shown in the example of FIG. 4.

By way of illustration, under normal operating conditions, the switches 252, 254, 256, 270, 272 and 274 are off, so that appropriate gate control signals can be provided to the respective power devices GUPRU, GUPRV, GUPRW, GDNU, GDNV and GDNW to control the associated motor, as is known in the art. However, in the event that an overvoltage condition exists at VMB, respective ones of the power switches 252, 254, 256, 270, 272 and 274 can be activated by their respective control signals to help limit the voltage across the associated power devices in accordance with an aspect of the present invention.

It is to be understood and appreciated that the power devices for driving the associated motor can be arranged in a traditional H-bridge configuration or in other arrangements, so as to be operative to provide desired current to the associated phase windings. However, in overvoltage conditions, it is desirable to operate the associated power devices in a manner so that current is not driven through the winding, but instead, is limited through the respective power devices, such as by modulating the high-side and/or low-side power devices in accordance with an aspect of the present invention.

Figure 6:
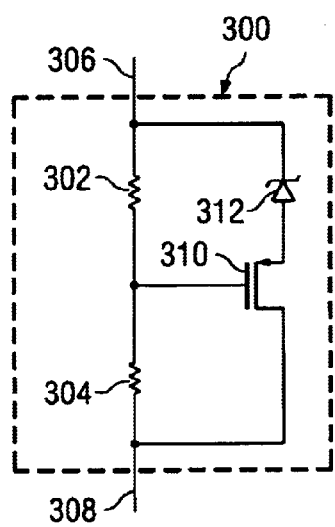
FIG. 6 is an example of a composite Zener that can be used to control a driver in accordance with an aspect of the present invention.
Figure 7:
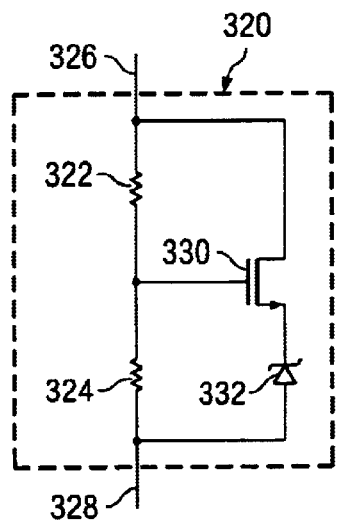
FIG. 7 is another example of a composite Zener that can be used to control a driver in accordance with an aspect of the present invention.

FIGS. 6 and 7 illustrate examples of composite Zeners that can be implemented in accordance of an aspect of the present invention, such as for use in the circuit in FIG. 4 or 5.

FIG. 6 illustrates a composite Zener 300 that includes series resistors 302 and 304 connected between a top 306 and a bottom 308 of the composite Zener 300 (top and bottom being used as relative terms simply to facilitate explanation of the composite Zener shown in FIG. 6). An intermediate node between the resistors 302 and 304 is coupled to a gate of a transistor 310. The transistor 310 can be a p-type MOSFET, as shown, or an n-type device. A Zener diode 312 is coupled between the top 306 and the source of the transistor 310.

In general, the configuration of the composite Zener 300 of FIG. 6 provides desired functionality by operating generally as a voltage level detector. For example, the voltage at which current begins to flow through the composite Zener 300 (e.g., the turn on voltage) can be estimated according to the following equation:

$$V_{CZ} = (V_{Z1} + V_{tM1})\left(\frac{R_1 + R_2}{R_2}\right)$$

where:
 $V_{CZ}=V_{top}-V_{bottom}=$Turn-on voltage of the Composite Zener 300
 $V_{tM1}=$Turn-on threshold of MOSFET 310; and
 $V_{Z1}=$Reverse breakdown of Zener diode 312.
 $R_1=$Value of resistor 302.
 $R_2=$Value of resistor 304.

In view of the foregoing equations, it will be appreciated that this arrangement allows a designer or manufacturer to select a turn on voltage that is not confined to the value of the reverse Zener breakdown, but instead can be a range of values determined by the ratio of the two resistors 302 and 304. In addition, the current that flows through the composite Zener 300 does not have to be very large and further can be determined by a current source associated with the composite Zener, such as sources 232 and 244 shown in FIG. 4. The current sources operate to turn the high-side and low-side power devices off by pulling their gate voltages low. When the breakdown voltage of the composite Zener 300 is exceeded (as shown in the above equation), enough current is provided to overpower the current sources. This operates to pull the gate voltages high, and turns on the respective high-side and/or low-side power device.

FIG. 7 illustrates another example of a composite Zener 320 that can be utilized in accordance with an aspect of the present invention. The composite Zener 320 includes a pair of resistors 322 and 324 connected in series between ends 326 and 328 of the composite Zener. The node between the resistors 322 and 324 is coupled to a gate of a transistor 330. The drain of the transistor is coupled to the end 326 and its source is coupled to the end 328 through a Zener diode 332. Those skilled in the art will understand and appreciate that the turn on voltage for the composite Zener 320 can be configured based on the resistors 322 and 324 in a manner similar to that shown and described above with respect to the foregoing equation.

Figure 8:
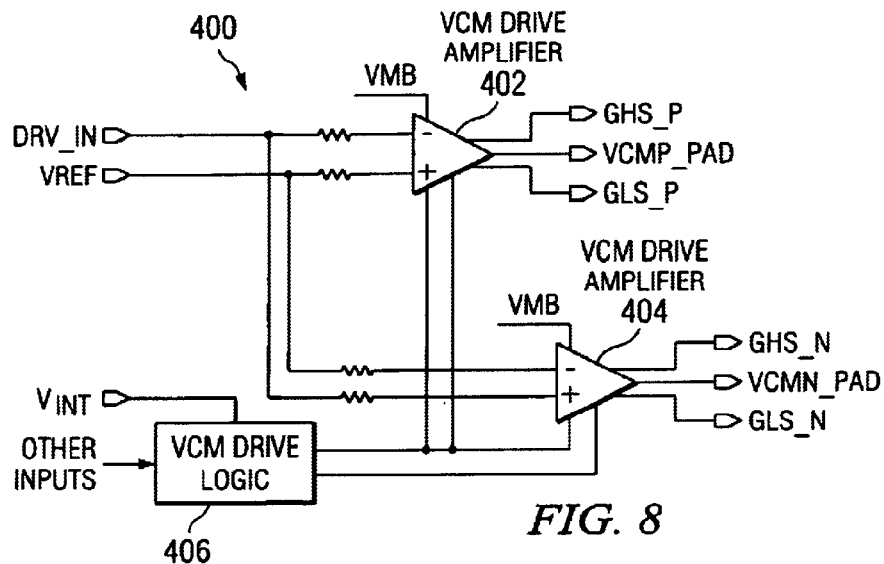
FIG. 8 is an example of a circuit diagram illustrating part of a protection system for a voice coil motor in accordance with an aspect of the present invention.
Figure 9:
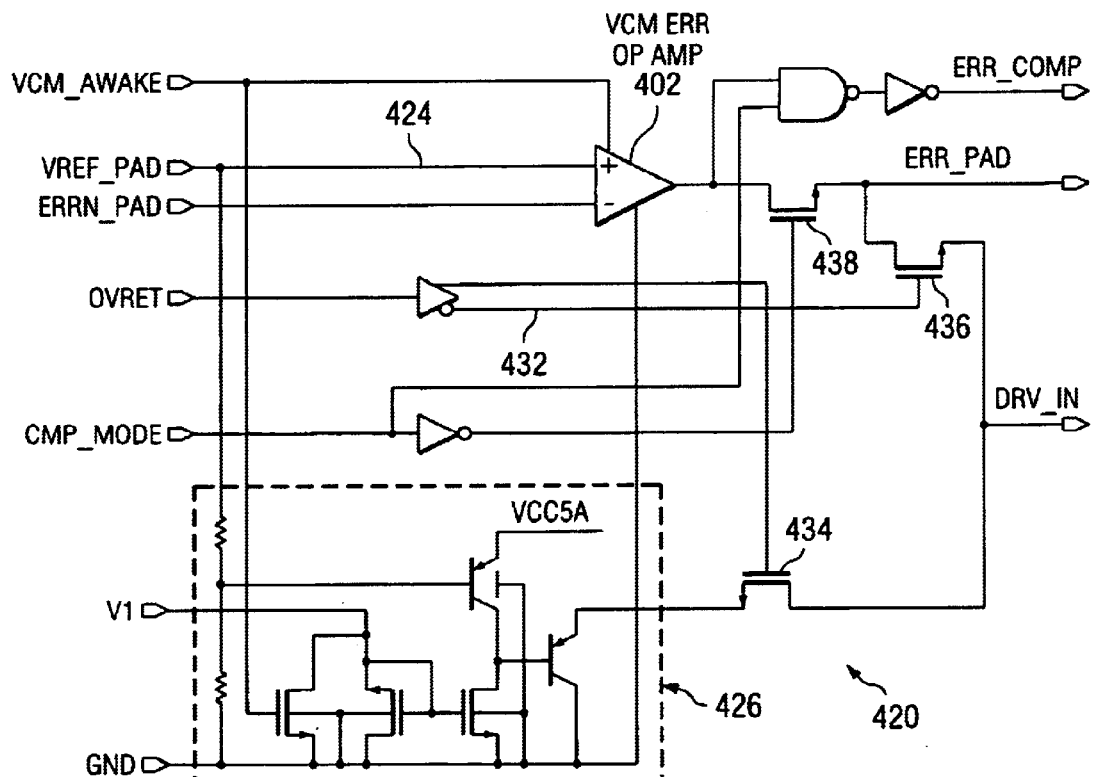
FIG. 9 is an example of a circuit diagram illustrating another part of a protection system for a voice coil motor in accordance with an aspect of the present invention.

FIGS. 8 and 9 illustrate an example of drive controls that can be implemented during an overvoltage condition relative to the driver for a voice coil motor (VCM). For example, the schematics of FIGS. 8 and 9 can be utilized to operate two pair of power devices (e.g., transistors) to selectively energize or de-energize an associated one phase VCM. The extension of such an arrangement to motors having other numbers of phases is considered straightforward in view of the description herein.

As mentioned above, during the detected overvoltage condition at an input terminal (e.g., pin) of an integrated circuit, a voice coil motor driver of the integrated circuit can be controlled to implement a low-voltage retract condition according to an aspect of the present invention. The low voltage retract can be implemented so that a fraction (e.g., about one-half) of the input supply voltage is applied across each of the high-side and low-side VCM power devices. By dividing the available voltage across the power devices, the potential across each of the devices can be reduced and, thereby help protect the devices during a detected overvoltage condition.

For example, a small differential voltage (e.g., about 1V) can be supplied to both sides of the VCM to cause the VCM to retract toward its power-off position. Alternatively, it is to be appreciated that a differential voltage need not be applied to the VCM driver. When the VCM outputs are at about one-half the supply, the high-side power device "sees" about one-half the total input supply voltage and the low-side power device sees the other half. This has the effect of doubling the input supply voltage at which breakdown usually occurs.

Turning now to FIG. 8, FIG. 8 illustrates drive circuitry 400 that can be employed for driving current relative to a single phase VCM in accordance with an aspect of the present invention. The driver system 400 includes a pair of VCM drive amplifiers 402 and 404 that receive the input supply VMB voltage. The amplifier 402 receives a driver input signal (DRV_IN) at an inverting input and a reference voltage (VREF) at a non-inverting input. In contrast, the amplifier 404 receives the drive input at a non-inverting input and the VREF signal at an inverting input. The driver system 400 also includes VCM drive logic 406, which is operative to control the respective amplifiers 402 and 404. The VCM drive logic 406 includes an internal regulated voltage, indicated at $V_{INT}$, as a power input as well as other inputs based on which the logic implements control. Those skilled in the art will understand and appreciate various signals that may be utilized to implement desired drive logic control with respect to a VCM motor. Each of the drive amplifiers 402, 404 provides an output voltage functionally related to the driver input signal DRV_IN and the reference voltage VREF input signal. In addition, the amplifiers 402 and 404 can be utilized to generate gate control signals, indicated at GHS_P, GLS_P, GHS_N, and GLS_N, of an H-bridge for controlling respective high-side and low-side power devices of the VCM motor driver.

FIG. 9 illustrates error circuitry 420 that can be utilized to generate the DRV_IN input signal in accordance with an aspect of the present invention. The error circuitry 420 includes a VCM ERR op amp that is employed to generate an error output signal (ERR_PAD) and the drive input (DRV_IN) signal. The op amp 422 receives a reference voltage (VREF_PAD) at a non-inverting input 424 and an error input (ERRN_PAD) at an inverting input thereof.

The error circuitry system 420 also includes an overvoltage retract (OVRET) signal which can be derived to indicate that an overvoltage condition exists in which it is desirable to implement a retract. The OVRET input is buffered to provide an indication of a overvoltage retract condition at 430 as well as is inverted to provide a non-retract indication at 432. The non-inverted OVRET signal at 430 is provided to a gate of a transistor 434, which is activated in the overvoltage mode to provide a desired DRV_IN output, such as about 1/12 of a volt generated by associated circuitry 426. The inverted OVRET signal at 432 is provided to a gate of another transistor 436 to directly couple the ERR_PAD output of the VCM ERR op amp 422 through another transistor 438 to provide a desired output at the drive input in the absence of an overvoltage condition. The transistor 438 is controlled based on a CMP_MODE input, which provides a logic input signal indicative of a desired operating mode of the VCM. Those skilled in the art will understand and appreciate various implementations of driver circuitry that can be utilized to implement a low voltage retract in response to detecting an overvoltage condition at an input terminal of an integrated circuit in accordance with an aspect of the present invention based on the description contained herein.

Figure 10:
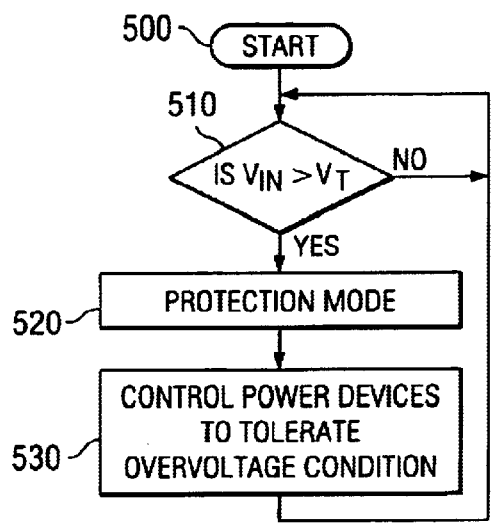
FIG. 10 is a flow diagram illustrating a methodology for protecting associated circuitry in accordance with an aspect of the present invention.
Figure 12:
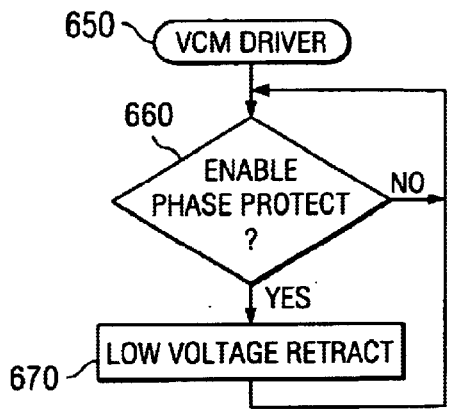
FIG. 12 is a flow diagram illustrating a methodology for protecting a voice coil motor driver in accordance with an aspect of the present invention.
Figure 11:
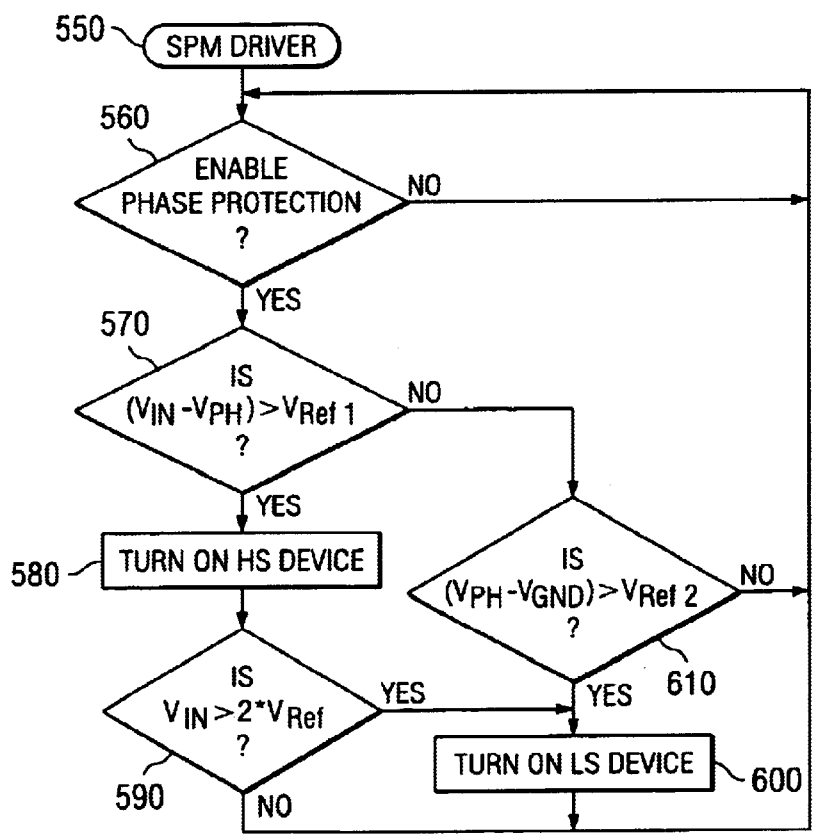
FIG. 11 is a flow diagram illustrating a methodology for protecting a driver in accordance with an aspect of the present invention.

In view of the foregoing structural and functional features described above, methodologies in accordance with various aspects of the present invention will be better appreciated with reference to FIGS. 10, 11 and 12. While, for purposes of simplicity of explanation, the methodologies of FIGS. 10–12 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is to be understood that the following methodologies can be implemented in hardware, integrated circuits, software, or a combination thereof.

FIG. 10 is a flow diagram illustrating a basic methodology for implementing overvoltage protection in accordance with an aspect of the present invention. The method is particularly well suited for protecting an IC from an excessive voltage supplied at an input terminal of the IC. In particular, the methodology provides an approach to help protect power devices of the IC that are supplied (directly or indirectly) by power provided at the input terminal.

The methodology begins at 500, such as in conjunction with powering up the IC. During power up, for example, prior to entering an active protection mode, power devices in associated drivers, such as a voice coil motor and a spindle motor, can be forced to off conditions. This mitigates shoot-through damage that might otherwise occur due to inductive effects in the supply lines. The inductive effects during power up, for example, could (in the absence of the present invention) cause the voltage at the IC to rise at a rate of several volts per microsecond.

Next at 510, after power up, a determination is made as to whether an overvoltage condition exists. The determination, for example, can include detecting a retract condition and/or detecting that an input supply voltage exceeds a predetermined reference voltage. The reference voltage can be selected as a function of the maximum allowed breakdown voltage of power components powered by the input voltage. If no overvoltage condition exists, the methodology can loop at 510 and operate in any of its other operating modes. If an overvoltage condition is detected at 510, the methodology proceeds to 520 in which a protection mode is entered. In the protection mode, normal operation of the circuitry is stopped, including, for example, energization of motor windings. While in the protection mode (520), circuitry within the IC, including power devices, powered by the input voltage at which an overvoltage condition exists are controlled at 530 in a manner more tolerant to the overvoltage condition in accordance with an aspect of the present invention.

For the example the methodology is being implemented in circuitry that includes one or more pairs of power devices (e.g., high-side and low-side devices) coupled to drive a load, such as a one or more phases of a motor winding, each pair of the power devices can operate so that the voltage across one or more of the power devices is limited. This can be implemented by turning one of the power devices on as the voltage across the respective power device reaches a predetermined reference voltage, which can be less than or equal to the breakdown voltage of the power device. In accordance with an aspect of the present invention, the predetermined reference voltage can be set to a desired level according to the particular application in which the methodology is being implemented.

FIGS. 11 and 12 illustrate two possible methodologies that can be implemented in an integrated circuit during a detected overvoltage condition, such as the protection mode 520 (FIG. 10) in accordance with an aspect of the present invention. While each of FIGS. 11 and 12 are directed to protecting power devices that control energization of drive motors for storage media, namely a spindle driver and a VCM driver, those skilled in the art will understand and appreciate other types and configurations of integrated circuits that can implement a methodology in accordance with an aspect of the present invention.

FIG. 11 depicts a methodology that can be used to protect drive circuitry associated with a motor (e.g., a spindle driver) in accordance with an aspect of the present invention. In this example, the spindle driver is supplied power from an input terminal of an IC, such as described above with respect to FIG. 10. The methodology begins at 550 with the spindle driver operating to control associated high-side and low-side power devices. For example, if the spindle motor is a three phase motor, there may be three pairs of power devices (e.g., one for each phase). Each pair of power devices can be connected to energize a respective phase winding of the motor, such as the winding coupled to a node located between the devices. The methodology depicted in FIG. 11 presumes that initially at 550, the spindle driver is operating in a normal mode, such as after a successful power-up.

At 560, a determination is made as to whether a protection mode of the driver has been enabled. This determination, for example, can be based on monitoring an input signal to associated drive control circuitry. The input signal can have a state that defines whether an overvoltage condition has been detected, such as described with respect to FIG. 10. If the determination is negative, the methodology loops at 560, such that the spindle driver can operate in one of its other modes. Other than the protection mode, for example, the spindle driver can operate in a normal mode or a retract mode. To facilitate protecting the power devices, the protection mode can override the other operating modes. If the protection mode is enabled at 560, the methodology proceeds to 570.

At 570, a determination is made as to whether the voltage across the high-side power device exceeds a reference level ($V_{REF1}$). For example, if the high-side device is coupled between the input voltage, which has been determined to be in an overvoltage state, and a phase node of an associated motor winding, the determination at 570 can be made as a function of the voltage potential between the input voltage and the phase voltage at the intermediate node (located between the high-side and low-side devices). If the voltage potential is greater than a threshold, the methodology proceeds to 580 in which the high-side is turned to its on condition. The threshold level can be set to adjust the clamping voltage according to the particular application in which the methodology is being employed. It is to be understood and appreciated that the functionality associated with 570 and 580 can be implemented as circuitry configured to bias the high-side to its on condition device when the condition at 570 is true.

Next, at 590 a determination is made as to whether the input voltage is greater than about twice the reference voltage of the power devices, which reference voltage can be set based on the breakdown voltage of the respective high-side and low-side power devices. If the determination is negative, indicating that the input voltage is less than twice the breakdown voltage, the methodology returns to 560. If the input voltage is greater than about two times the breakdown voltage, the methodology can proceed to 600. At 600, the low-side power device is also turned to its on condition. Thus, because the high-side and low-side devices are in their on conditions, the voltages across both devices are limited. As an alternative to this voltage limiting approach, both devices could be turned off at 600. This could provide protection that is the sum of the low-side and high-side breakdown voltages. For this to be effective, the node between the two devices should not be driven or loaded. This alternative method could help protect to a higher voltage than the limiting method described above, because the limiting method normally has to have some margin to account for variations in the breakdown voltages. Thus, in accordance with an aspect of the present invention, concurrent operation of both devices can be implemented by either turning both devices on or turning both devices off during such an overvoltage condition. From 600, the methodology returns to 560.

If the determination at 570 is negative, indicating that the voltage across the high-side device is not greater than a reference voltage, the methodology proceeds to 610. At 610, a determination is made as to whether the voltage potential across the low-side device exceeds a reference level ($V_{REF2}$). The reference level $V_{REF2}$ employed with respect to the low-side device can be the same as or different from that used at 570 with respect to the high-side device, such as depending on the device characteristics. For the example where the low-side device is coupled between the phase node and electrical ground, the determination can be made as a function of the phase voltage at the node between the high-side and low-side devices and electrical ground (e.g., $V_{PHASE}-V_{GND}$). If the voltage potential is greater than the threshold ($V_{REF2}$), which can be fixed or variable, the methodology proceeds from 610 to 600 in which the low-side device is turned to its on condition. It is to be understood and appreciated that the functionality associated with 610 and 600 can be implemented as any circuitry configured to bias the low-side device when the condition at either of 610 or 590 is true.

By operating the spindle motor drive circuitry according to the methodology of FIG. 11, the input supply voltage of the integrated circuit at which breakdown of the power devices tends to occur can be effectively doubled. As a result, the spindle motor power devices (e.g., Power MOSFET devices) can tolerate a higher input supply voltage at the input pin. It is to be understood and appreciated that the methodology can operate during any detected overvoltage condition, such as an overvoltage supplied at the input pin as well as during a power-down retract event to prevent spindle motor flyback from pumping the supply high. Those skilled in the art will understand and appreciate other circumstances or applications in which it may be desirable to implement a protection methodology in accordance with an aspect of the present invention.

FIG. 12 illustrates an example of a methodology that can be employed to protect drive circuitry of a voice coil motor during a detected overvoltage condition in accordance with an aspect of the present invention. The methodology begins at 650, such as with the VCM operating in a non-protection mode (e.g., a normal operating mode). At 660, a determination is made as to whether a protection mode of the driver has been enabled. This determination, for example, can be based on monitoring an input control signal provided to the VCM drive circuitry. The input signal, for example, defines whether an overvoltage condition has been detected, such as described with respect to FIG. 10. If the determination is negative, the methodology can loop at 660, such that the spindle driver can operate in one of its other modes (e.g., a normal mode or a retract mode). To facilitate protecting the power devices, the protection mode can override the other operating modes. If the protection mode is enabled at 660, the methodology proceeds to 670.

At 670, the VCM driver enters a low voltage retract condition. For example, in this operation, the driver can attempt to maintain both sides of the motor phase at voltage levels near about one-half of the input supply voltage, with an approximately 1V differential between the two sides that causes the VCM to retract toward its power-off position. It is to be appreciated that a differential voltage is not required to operate the VCM to provide overvoltage protection according to the present invention.

By way of illustration, during normal operation of the VCM, the amplitude and direction of the output swing of VCM driver is determined by the difference between an input voltage and the reference voltage for the circuit. Holding the input at the reference voltage drives the outputs to about one-half the input supply with no differential across them. When each of the outputs of the VCM drive circuitry is at about one-half the supply voltage, the high-side power device sees about one-half the total input supply voltage and the low-side power device sees the other one-half. This has the effect of doubling the input supply voltage at which breakdown typically occurs. From 670, the methodology can return to 660 where it can remain in the protection mode, if enabled, or enter one of its other conventional operating modes.

In view of the foregoing, it is to be understood and appreciated that systems and methods implemented to help protect an IC, in accordance with an aspect of the present invention, without using a large amount of die area on the IC. The above solutions facilitate protection by setting various circuits into modes that are reasonably tolerant of high voltages, so that the voltage at the supply pins is allowed to be high.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An overvoltage protection system, comprising:
   a detector that detects a voltage level at an input and provides a mode signal based on the detected voltage level; and
   an output stage having first and second active components electrically coupled in series between the input and a second voltage level that is lower than the input, the first and second components being controlled to limit the voltage across at least one of the first and second components based on the mode signal indicating an overvoltage condition, so that the first and second components can tolerate an increased voltage level at the input, an intermediate node connecting the first and second components in series between the input and the second voltage, in response to detecting an overvoltage condition at the input, the voltage potential between the intermediate node and the input controlling operation of the first component and the voltage potential between the node and the second voltage level controlling operation of the second component.

2. An overvoltage protection system, comprising:

a detector that detects a voltage level at an input and provides a mode signal based on the detected voltage level; and an output stage having first and second active components electrically coupled in series between the input and a second voltage level that is lower than the input, the first and second components being controlled to limit the voltage across at least one of the first and second components based on the mode signal indicating an overvoltage condition, so that the first and second components can tolerate an increased voltage level at the input, first and second control systems, the first control system connected to control the first component based on the mode signal and a voltage potential across the first component, the second control system connected to control the second component based on the mode signal and a voltage potential across the second component.

3. The system of claim 2, the first and second control systems implementing mutually exclusive operation of the first and second components during the overvoltage condition to mitigate shoot through current.

4. The system of claim 2, the first and second control systems implementing concurrent operation of the first and second components during the overvoltage condition if the voltage level at the input exceeds about twice a maximum allowed voltage level.

5. The system of claim 4, the concurrent operation of the first and second components corresponding to turning both of the first and second components on or off during the overvoltage condition.

6. The system of claim 2, the first component further comprising a first variable resistance device connected between the input and an intermediate node interconnecting the first and second components, the first control system being operative to control the resistance of the first resistance device based on the mode signal and the voltage potential between the input and the intermediate node.

7. The system of claim 6, the second component further comprising a variable resistance device connected between the intermediate node and the second voltage level, the second control system being operative to control the resistance of the second resistance device based on the mode signal and the voltage potential between the intermediate node and the second voltage level.

8. The system of claim 7, the first and second components further comprising respective first and second transistor devices, the first transistor device being operative to provide the variable resistance between the input and the intermediate node, the second transistor device being operative provide the variable resistance between the intermediate node and the second voltage level.

9. The system of claim 2, the first control system further comprising a first composite Zener coupled across part of the first component operative to control operation of the first component based on the voltage level across the first component, the second control system further comprising a second composite Zener coupled across part of the second component operative to control operation of the second component based on the voltage level across the second component.

10. The system of claim 9, each of the first and second composite Zeners being configurable to control at which voltage level each of the respective first and second components can turn on.

11. The system of claim 2, the first and second components further comprising respective first and second transistor devices that define high-side and low-side power devices for a leg a half-bridge circuit.

12. An overvoltage protection system, comprising:

a detector that detects a voltage level at an input and provides a mode signal based on the detected voltage level;

an output stage having first and second active components electrically coupled in series between the input and a second voltage level that is lower than the input, the first and second components being controlled to limit the voltage across at least one of the first and second components based on the mode signal indicating an overvoltage condition, so that the first and second components can tolerate an increased voltage level at the input, the first and second components further comprising respective first and second transistor devices that define high-side and low-side power devices for a leg a half-bridge circuit, and an intermediate node interconnecting the first and second transistor devices operatively, the node being connectable to a phase winding of an associated motor.

13. The system of claim 12, one of the first and second components being connected to source current relative to the intermediate node and the other of the first and second components being connected to sink current relative to the node.

14. An overvoltage protection system, comprising:

a detector that detects a voltage level at an input and provides a mode signal based on the detected voltage level; and an output stage having first and second active components electrically coupled in series between the input and a second voltage level that is lower than the input, the first and second components being controlled to limit the voltage across at least one of the first and second components based on the mode signal indicating an overvoltage condition, so that the first and second components can tolerate an increased voltage level at the input, implemented as part of an integrated circuit, the output stage forming part of a driver operative to control an associated motor.

15. An overvoltage protection system, comprising:

a mode selector operative to detect a condition requiring overvoltage protection and to provide a mode signal indicative thereof;

a control system operative to provide first and second control signals based on the mode signal;

a first active variable resistance device coupled between an input supply voltage and a node, the control system providing the first control signal to cause the first active variable resistance device to provide a low resistance during an overvoltage condition based on a voltage potential across the active variable resistance device relative to a first threshold level; and a second active variable resistance device coupled in series with the first active variable resistance between the node and a second terminal at a voltage level that is less than that supplied by the input supply voltage, the control system providing the second control signal to cause the second active variable resistance device to provide a low resistance during an overvoltage condition based on a voltage potential across the second active variable resistance device relative to a second threshold level.

16. The system of claim 15 implemented as part of an integrated circuit, the output stage forming part of a driver operative to control an associated motor.

17. The system of claim 15, each of the first and second active variable resistance devices further comprises a respective power transistor device.

18. The system of claim 17, each of the first and second threshold levels are determined according to a breakdown voltage of the respective first and second power transistor devices.

19. The system of claim 17, the control system further comprises first and second composite Zener systems coupled across a respective one of the first and second power transistor devices, the first composite Zener system being operative to control when to turn on the first power transistor device based on the voltage potential across the first power transistor device during an overvoltage condition, the second composite Zener system being operative to control when to turn on the second power transistor device based on the voltage potential across the second power transistor device during an overvoltage condition.

20. The system of claim 15, the condition requiring overvoltage protection comprising at least one of an overvoltage condition at an input terminal of an integrated circuit that includes the system and a retract condition for an associated spindle motor.

21. An integrated circuit to control at least one motor, comprising:
   an input terminal that receives an input supply voltage;
   a detection system operative to detect an overvoltage condition at the input terminal and provide an overvoltage condition signal indicative thereof;
   a driver having at least one pair of high-side and low-side power devices electrically coupled in series between the input terminal and ground potential, an intermediate node between the at least one pair of power devices and operative to provide power to an associated phase of the motor; and
   an overvoltage control system connected to each of the high-side and low-side power devices to control each of the high-side and low-side power devices in a mode tolerant to an overvoltage condition based on the overvoltage condition signal and a voltage potential across the respective high-side and low-side power devices.

22. The integrated circuit of claim 21, the driver comprising a spindle driver operative to energize at least one phase of a spindle motor.

23. The integrated circuit of claim 22, wherein said driver is a voice coil motor driver operative to energize at least one phase of a voice coil motor, the voice coil motor driver implementing a low voltage retract condition based on the overvoltage protection signal.

24. A method to protect an integrated circuit that includes an input terminal that receives an input supply voltage and that includes at least one pair of active components connected in series between the supply voltage and a lower voltage level, at least one pair of active components being operative to at least one of source or sink electrical current relative to a node interconnecting the first and second active components, the method comprising:
   detecting a condition in which overvoltage protection is desired;
   in response to detecting the condition, operating at least one of the first and second active devices in a mode that limits a voltage potential across at least one of the first and second active devices so as to be more tolerant to the detected overvoltage condition,
   a composite Zener operatively connected to control operation of each respective one of the active components, each of the composite Zeners turning on the respective one of the active components based on the detected condition and a voltage potential across the respective one of the active components.

25. The method of claim 24, further comprising, in response to detecting an overvoltage condition in which the voltage at the input terminal exceeds about twice a maximum allowed voltage level, concurrently operating the first and second active devices in an off or on condition so as to better tolerate the detected overvoltage condition.

26. The method of claim 24, the first and second active components comprising high-side and low-side power transistors of a spindle driver circuit, the integrated circuit further comprising a voice coil motor driver electrically coupled to the input terminal, the method further comprising operating the voice coil motor driver to implement a retract in response to detecting that the input supply voltage is in an overvoltage condition.

27. The method of claim 24, the at least one pair of active components comprising a pair of power transistor devices, each having a control input, the method further comprising providing an input signal to the control input of at least one of the transistor devices to turn at least one of the transistor devices to an on condition to effectively limit a maximum voltage potential across at least one of the transistor devices during a detected overvoltage condition.

* * * * *